United States Patent [19]

Austin

[11] Patent Number: 5,503,422
[45] Date of Patent: Apr. 2, 1996

[54] HITCH ALIGNMENT APPARATUS AND METHOD

[76] Inventor: George H. Austin, 5202 Rte. 250 North, Norwalk, Ohio 44857

[21] Appl. No.: 287,220

[22] Filed: Aug. 8, 1994

[51] Int. Cl.⁶ ........................................ B60D 1/06
[52] U.S. Cl. ............................... 280/477; 280/511
[58] Field of Search ................. 280/477, 478.1, 280/504, 508, 511

[56] References Cited

U.S. PATENT DOCUMENTS

| | | | |
|---|---|---|---|
| 3,879,062 | 4/1975 | Miller | 280/477 |
| 4,416,466 | 11/1983 | Park | 280/477 |
| 4,560,183 | 12/1985 | Cook | 280/477 |
| 4,657,275 | 4/1987 | Carroll | 280/511 X |
| 4,844,496 | 7/1989 | Webb et al. | 280/511 X |
| 4,871,184 | 10/1989 | Johnson | 280/477 |
| 5,114,170 | 5/1992 | Lanni et al. | 280/477 |
| 5,161,815 | 11/1992 | Penor, Jr. | 280/477 |

*Primary Examiner*—Brian L. Johnson
*Assistant Examiner*—Victor E. Johnson
*Attorney, Agent, or Firm*—Renner, Otto, Boisselle & Sklar

[57] ABSTRACT

A hitch alignment apparatus comprising a mount having a base for engaging an underside of a drawbar of a ball hitch and a latch pins for engaging the ball hitch above the base thereby holding the base to the drawbar, and a ramp member, having a pair of sidewalls, rigidly secured to a front end of the mount at an elevation above the latch pins, the pair of sidewalls converging as they approach the front end of the mount.

19 Claims, 3 Drawing Sheets

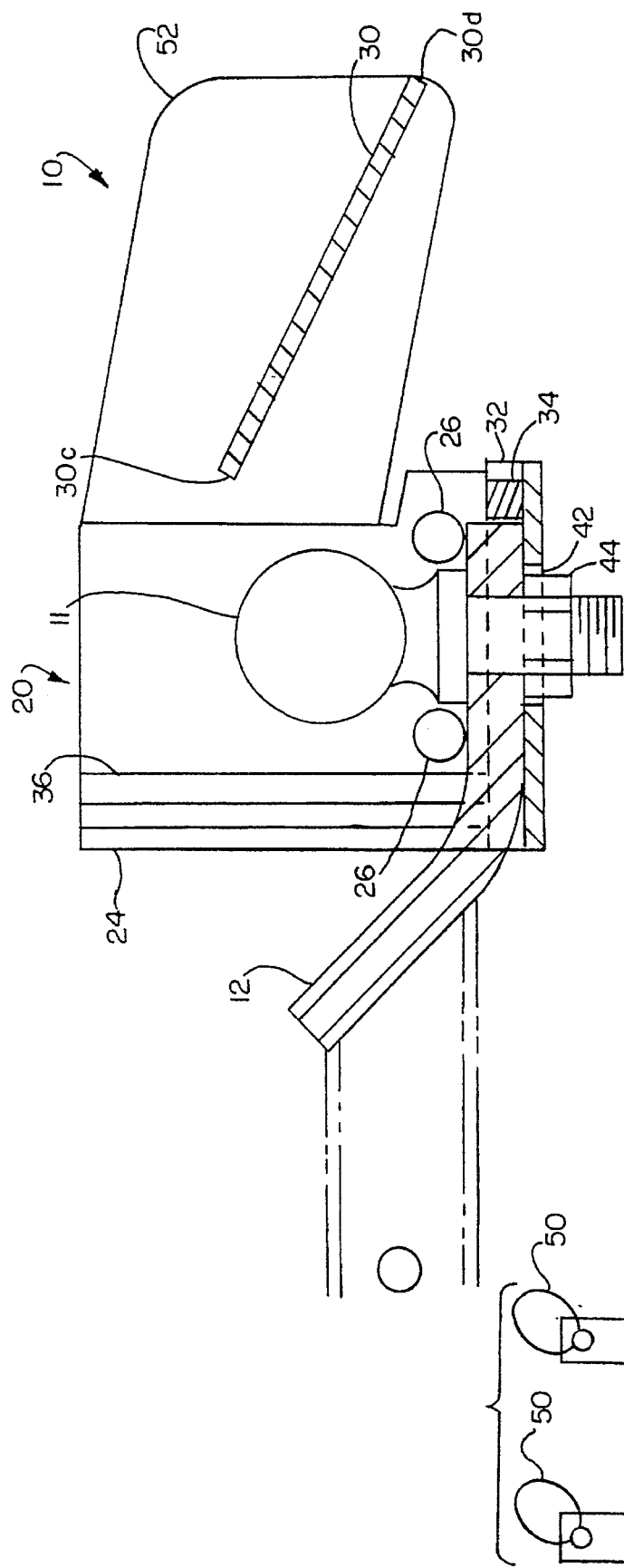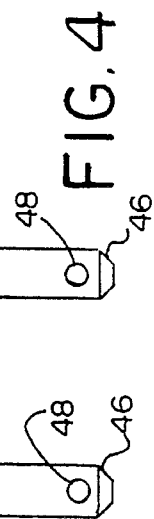

HITCH ALIGNMENT APPARATUS AND METHOD

TECHNICAL FIELD OF THE INVENTION

The present invention relates to a guiding apparatus and method for a ball-type trailer hitch which will align the ball of the hitch with the inverted slot on the coupling member of a trailer by simply backing the vehicle into contact with the coupling member of the trailer.

BACKGROUND OF THE INVENTION

A majority of commercial hitches have used a ball and socket connection in which the ball is vertically mounted on the towing vehicle and the inverted socket on the coupling member of the trailer. Trailers which have light weights are not difficult to attach to the ball since they can be easily lifted manually and guided into engagement with the ball. However, heavier trailers are difficult to manually attach to a stationary towing vehicle, requiring instead that the towing vehicle maneuver the ball under the stationary inverted socket of the coupling member and then having the operator lower the coupling member into engagement with the ball through the use of a screw jack or other similar device. This alignment process is difficult for an individual since he cannot see the ball and coupling member from the driver's seat of the towing vehicle. To aid in the alignment process, there have been several attempts to create a guiding apparatus which may be used.

U.S. Pat. No. 4,844,496 to Webb et al. shows a trailer hitch guide apparatus that has a ramp bounded by a pair of vertical guides. The apparatus can be assembled with respect to a bumper flange in surrounding relationship to a trailer ball for use in docking the hitch socket to the hitch ball. After the docking procedure is completed, the apparatus is said to be slidably removable from the bumper flange. The apparatus, however, only raises the hitch socket to a point below the level of the hitch ball. As a result, the user must still raise and further align the hitch socket with the hitch ball.

U.S. Pat. No. 4,657,275 to Carroll discloses a self-aligning trailer hitch. This hitch includes a ramp member pivotally attached to an extension member that in turn is slidably engaged with the base of the hitch so that the ramp member and extension member may be readily removed once the trailer hitch coupler has been engaged with the ball. In use, the trailer tongue is lifted and guided by the ramp member to a position above the ball. Continued movement causes the trailer tongue to trip a ramp support that allows the ramp to drop and consequently the trailer tongue. A problem with this device is that recoil of the trailer may cause the tongue to miss or improperly drop onto the ball. As the device is forced against the trailer, rearward travel of the trailer necessarily must be restrained as by wheel chocks. However, play in the trailer suspension will allow the trailer to rock back with stored recoil force. Once the ramp collapses, the trailer will rock forward by reason of the stored recoil force. This forward motion of the trailer may cause the tongue to miss or not properly engage the ball as the tongue drops. Also, the device of this patent requires a special base plate which remains with the ball, whereby the device can only be used with ball hitches equipped with this special base plate.

SUMMARY OF THE INVENTION

The present invention provides a hitch alignment apparatus which includes a mount that can be releasably attached to and removed from a ball hitch. The mount has a base for engaging the underside of a drawbar of the ball hitch and a latch means for engaging the ball hitch above the base, thereby holding the base to the underside of the drawbar. A ramp is rigidly attached to the front of the mount and rises to an elevation above the latch means and in use above the ball of the ball hitch. The ramp is bounded at its sides by a pair of sidewalls that diverge to form a wide mouth for guiding a coupling member such as a trailer tongue into a centering pocket atop the mount which functions to laterally center the coupling member over the ball. The apparatus further comprises a back plate which can be removably inserted from the top into a groove or slot formed in the rear of the mount to form a back stop that is engaged by the leading end of the coupling member to axially center the socket of the coupling member above the ball of the ball hitch.

In a preferred embodiment, the mount includes a pair of sides extending upwardly from the base to form the centering pocket. The sides have inwardly turned rear end portions forming an upwardly opening slot which is sized to receive the drawbar of the ball hitch.

The base of the mount also includes a slot to receive the drawbar of the ball hitch. The slot is designed to limit lateral shifting movement of the mount relative to the drawbar, and to that end is approximately the same width as the width of the drawbar.

The latch means preferably includes at least one and more preferably a pair of latch pins. The latch pins can have a handle on one end to facilitate insertion and removal of the pin in laterally aligned holes in the sides of the centering pocket which position the latch pins for engaging a top side of the ball hitch, thereby preventing the mount from falling off the ball hitch. On the other end, the latch pin can have a locking mechanism, such as a detent assembly, to ensure that the latch pin cannot be accidentally dislodged.

According to the method of the invention, the mount of the apparatus is slipped onto the ball hitch from underneath and then secured in place by the latch means, such as the latch pins. The back plate is then inserted into the slot in the rear of the mount.

A trailer jack or the like is used to raise or lower the coupling member to an elevation just above the elevation of the bottom edge of the ramp. The towing vehicle is then backed up to bring the ramp of the alignment apparatus into contact with the coupling member. As the towing vehicle moves backwards, the ramp will raise the coupling member while the ramp sidewalls guide the coupling member into the centering pocket. Backing of the towing vehicle is stopped when the vehicle operator feels the coupling member strike the back plate. At this point the coupling member will have been raised and centered above the ball of the ball hitch.

The coupling member is then raised as by using the trailer jack to lift the coupling member off the ramp. The apparatus is then removed by removing the back plate and disengaging the latch means to release the mount which then may be removed from the ball hitch. The operator then lowers the coupling member until it comes into engagement with the ball of the hitch, thus connecting the trailer to the towing vehicle.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 3 is a sectional view of a hitch alignment apparatus according to the present invention cut along line 3—3, but showing the ball and nut in elevation.

FIG. 4 is a top view of a pair of latch pins used to connect the apparatus to a drawbar.

DETAILED DESCRIPTION

Figure 1:
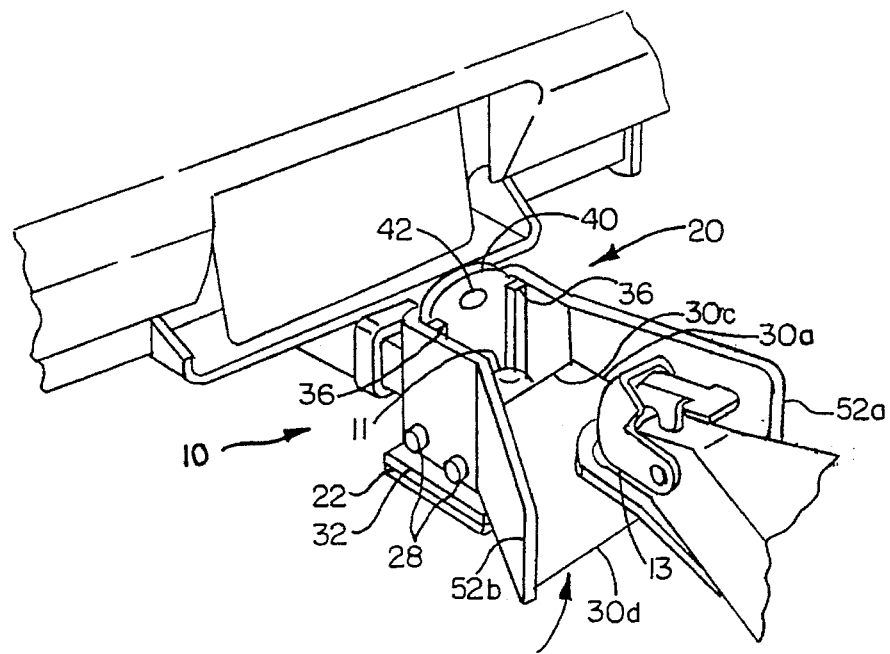
FIG. 1 is a perspective view of a hitch alignment apparatus according to the present invention mounted on a standard ball hitch.

Referring to FIG. 1, a hitch alignment apparatus according to the invention is generally indicated by reference numeral 10. The apparatus 10 is shown mounted to a standard ball hitch 11. The hitch alignment apparatus 10 includes a mount 20 in the form of an inverted yoke having a base 22 and upright, L-shape sides 24, as better shown in FIG. 3. The sides 24 have a pair of apertures 26 disposed at their bottom for receiving a pair of latch pins 28, The latch pins 28 rest on a drawbar 12 for holding the hitch alignment apparatus 10 to the drawbar 12. A ramp 30 is attached to the mount 20 for lifting the trailer tongue or other coupling member 13 above the ball 11.

Figure 2:
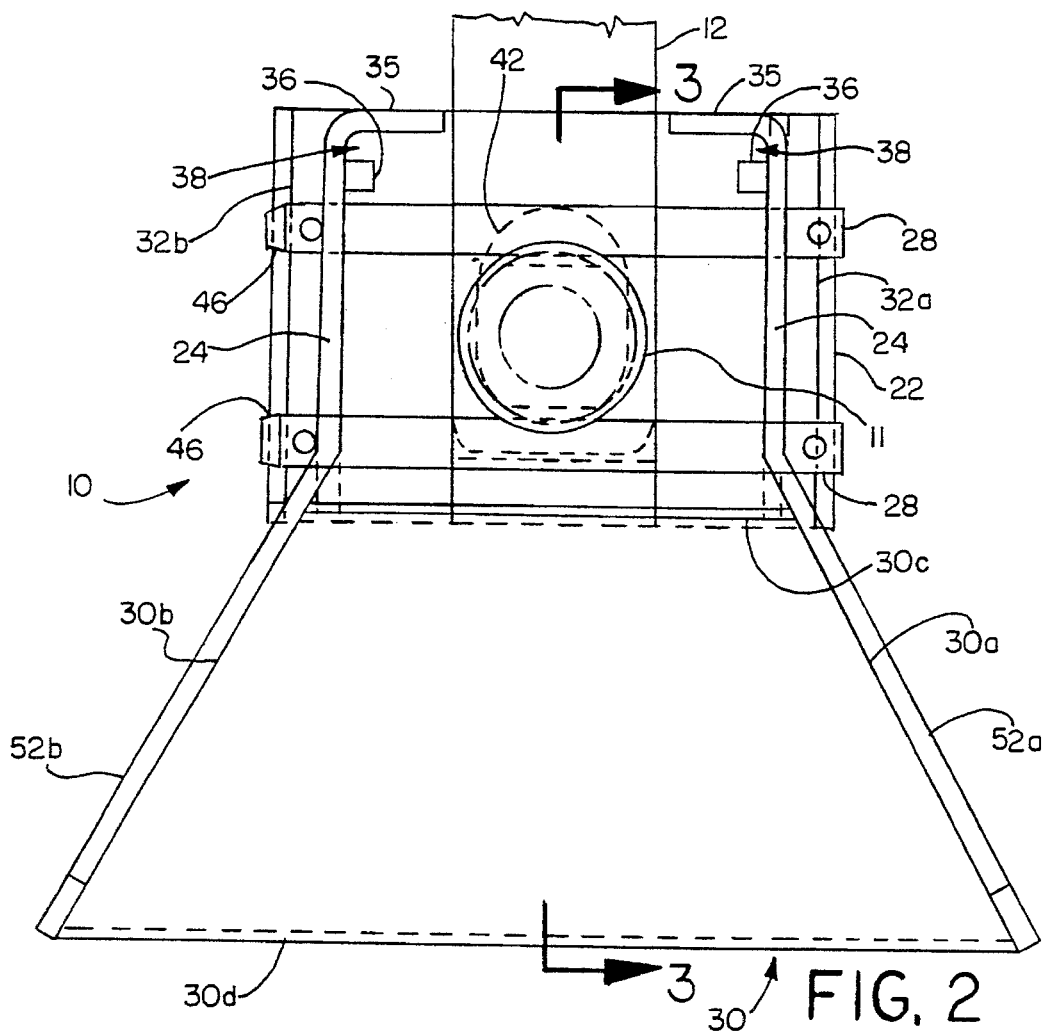
FIG. 2 is a top view of a hitch alignment apparatus according to the present invention.
Figure 5:
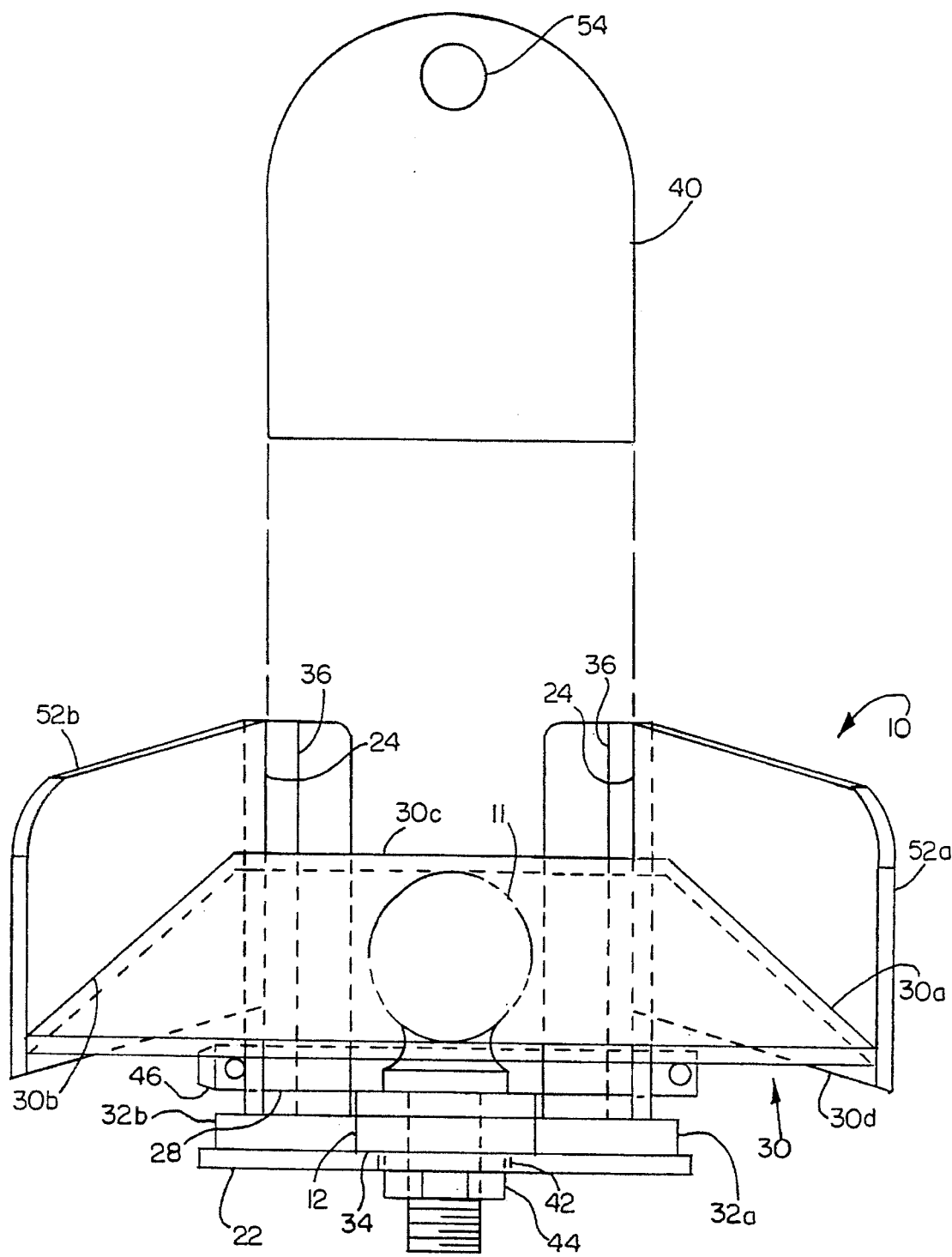
FIG. 5 is a front view of a hitch alignment apparatus according to the present invention.

FIGS. 2, 3 and 5 illustrate the hitch alignment apparatus 10 mounted to the drawbar 12 of the ball hitch 11. The drawbar 12 is received in a longitudinal slot formed between a pair of guidebars 32a and 32b of the base 22. The guidebars limit lateral shifting movement of the mount relative to the drawbar 12. Latch pins 28 extend through aligned apertures 26 in the sides 24, as best illustrated in FIG. 3. The latch pins 28 are disposed front and back of the ball 11, and hold the base 22 to the underside of the drawbar 12. A stop 34, located between the front ends of guidebars 32a and 32b, limits axial movement of the hitch alignment apparatus 10. More particularly, the stop 34 is a bar fixed to the base that engages the end of the drawbar 12 to prevent the hitch alignment apparatus 10 from sliding too far towards the towing vehicle on the drawbar 12.

Also illustrated in FIG. 2, the sides 24 are turned inwardly at the rear end of the mount 20 to form flanges 35. Attached to the sides and spaced forwardly of the flanges 35 are vertical bars 36 which cooperate with the flanges 35 to form channels 38 which define opposite ends of a slot. The slot receives a back plate 40, which is inserted after the mount 20 is attached to the drawbar 12.

The base 22 also has a hole 42 located in its center. The hole is designed to accommodate the nut 44 which fastens the ball 11 to the drawbar 12. The hole 42 is best illustrated in FIG. 3.

FIG. 4 shows a pair of latch pins 28 used to attach the hitch alignment apparatus 10 to the drawbar 12. The latch pins 28 have a generally tapered end 46 to facilitate insertion into the apertures 26. A retractable locking mechanism 48 is located proximal to the tapered end 46 of the latch pin 28. The locking mechanism 48 should ensure that the latch pin 28 cannot be removed without application of a sufficient force in a direction opposite to the direction of insertion. In the preferred embodiment, this locking mechanism 48 is a spring-biased detent assembly. The latch pin 28 may also have a handle 50, such as a loop, to permit a user readily to remove and insert the latch pin 28. The handle 50 is most suitably located at the end of the latch pin 28 opposite the locking mechanism 48.

The rear edge 30c of ramp 30 is rigidly attached to the front end of the mount 20. As shown in FIG. 5, the upper rear edge 30c of the ramp is at a slightly higher elevation than the top of the ball 11 and consequently the elevation of the latch pins 28. The ramp 30 is generally in the shape of a trapezoid, with edges 30a and 30b of the ramp 30 attached to side walls 52a and 52b that diverge as they move away from the mount 20. The sidewalls 52 are also joined to the sides 24 of the mount 20, and serve as a guide for the coupling member 13 as it travels up the ramp 30.

The sides 24 form therebetween a centering pocket which is the approximate width of the coupling member 13. The centering pocket functions to laterally center the coupling member 13 over the ball 11.

FIG. 5 also shows the back plate 40 positioned above the hitch alignment apparatus 10, ready for insertion. The back plate 40 has a finger hole 54 through its top portion. The finger hole 54 permits the user to insert and to remove the back plate 40 with relative ease. It should be readily apparent to those skilled in the art that other means for facilitating removal of the back plate 40, such as a handle, could also be used.

In operation according to the method of the invention, a towing vehicle is backed up such that the ball 11 is in rough alignment with the coupling member 13 of a ball hitch. The mount 20 of the hitch alignment apparatus 10 is mounted onto the ball hitch 11 from underneath. While the base 22 of the mount 20 is held to the bottom side of the drawbar 12, the latch pins 28 are inserted through the apertures 26 across the drawbar 12, securing the hitch alignment apparatus 10 to the drawbar 12. The back plate 40 may now be slid into the slot in the mount 20.

A lift apparatus (not shown), such as a trailer jack, is used to raise or lower the coupling member 13 to a point just above the forward edge 30d of the ramp 30. Also, the trailer wheels are chocked to prevent the trailer from being pushed back when the hitch alignment apparatus 10 strikes the coupling member 13.

The towing vehicle may then be backed slowly towards the coupling member 13, which rides up the ramp 30. The vehicle continues backing until the coupling member 13 hits the back plate 40. At this point, the socket of the coupling member 13 and ball 11 of the ball hitch are in alignment with one another.

Preferably the vehicle's transmission is put in neutral at this time and its brake released to allow any stored recoil force in the trailer to be released. The stored recoil force will move both the trailer and vehicle together, the alignment apparatus keeping the socket of the coupling member aligned with the ball. Once released, the parking brake of the vehicle may be set to complete the coupling process.

Next, the coupling member 13 is raised slightly as by the trailer jack to lift it a short distance above the ramp 30. The hitch alignment apparatus 10 is then removed by first taking out the back plate 40. Next, the latch pins 28 are removed. At this point, the hitch alignment apparatus 10 can be lowered away from the drawbar 12. The drawbar 12 will pass through the opening in the rear end of the mount 20 formed by the L-shaped sides 24 and out the open top of the mount, thus freeing the apparatus 10.

Once the hitch alignment apparatus 10 has been removed, the trailer jack can be used to lower the coupling member 13 onto the ball 11.

Although the invention has been shown and described with respect to a preferred embodiment, it is obvious that equivalents and modifications will occur to others skilled in the art upon the reading and understanding of the specification. For example, the mount may be held to the ball hitch by other latch mechanisms other than the latch pins such as, for example, latch arms pivotally attached to the mount for movement from an ambush position permitting assembly of the mount onto the ball hitch to an engagement position over top of the ball hitch to hold the mount to the draw bar. The present invention includes all such equivalents and modifications, and is limited only by the scope of the claims.

What is claimed is:

1. A hitch alignment apparatus comprising:

a mount having front and rear ends, a base for engaging an underside of a drawbar of a ball hitch, a pair of walls extending upwardly from said base, latch means for engaging said ball hitch above said base thereby holding said base to said drawbar, and an opening located between said walls at the rear end of said mount, said opening for receiving the drawbar;

a ramp member, having a pair of sidewalls, said ramp member being rigidly secured to the front end of said mount with an upper rear end of said ramp member at an elevation above said latch means, and said pair of sidewalls converging as they approach said upper rear end of said ramp member; and a back plate removably inserted between said walls at the rear end of said mount to close said opening, wherein removal of said back plate permits lowering of said mount from the underside of the drawbar when the latch means is disengaged.

2. A hitch alignment apparatus according to claim 1, wherein said pair of walls extending upwardly from said base form therebetween a centering pocket.

3. A hitch alignment apparatus according to claim 1, wherein said base includes a slot to receive and laterally constrain said drawbar.

4. A hitch alignment apparatus according to claim 3, wherein said slot limits movement of said hitch alignment apparatus about a longitudinal axis of said drawbar.

5. A hitch alignment apparatus according to claim 3, wherein said slot is approximately the same width as said drawbar.

6. A hitch alignment apparatus according to claim 1, wherein said base has a centrally located hole.

7. A hitch alignment apparatus according to claim 1, wherein said latch means includes at least one latch pin.

8. A hitch alignment apparatus according to claim 7, wherein said latch pin has a detent assembly in one end.

9. In combination, a hitch and a hitch alignment apparatus, said hitch comprising an upstanding ball mounted to a drawbar, said drawbar being connected to a bumper flange of a towing vehicle, and said hitch alignment apparatus including a mount having front and rear ends, a base for engaging an underside of said drawbar, a pair of walls extending upwardly from said base, latch means for engaging said drawbar above said base and thereby holding said base in engagement with the underside of said drawbar, and an opening located between said walls at the rear end of said mount, said opening for receiving the drawbar, a removable back plate inserted between said walls at the rear end of said mount for closing said opening, and a ramp member, having a pair of sidewalls, said ramp member being rigidly mounted to the front end of said mount with an upper rear end of said ramp member at an elevation above said ball, wherein removal of said back plate permits lowering of said mount from the underside of the drawbar when the latch means is disengaged.

10. A combination according to claim 9, wherein said pair of sidewalls converge as they approach said upper rear end of said ramp member.

11. A combination according to claim 9, wherein a portion of said walls are turned inwardly to form the opening in said rear end of said mount that is closed by said back plate.

12. A combination according to claim 11, wherein the width of said opening is larger than the width of said drawbar.

13. A combination according to claim 9, wherein said base includes a slot to receive said drawbar, said slot limiting lateral movement of said hitch alignment apparatus relative to said drawbar.

14. A combination according to claim 13, wherein said slot is approximately the same width as said drawbar.

15. A combination according to claim 9, wherein said base has a centrally located hole for accommodating a fastener securing said ball to said drawbar.

16. A combination according to claim 9, wherein said latch means includes at least one latch pin.

17. A combination according to claim 16, wherein said latch pin has a detent assembly in one end.

18. A combination according to claim 17, wherein said latch pin has a handle in an end opposite said detent assembly.

19. A method of aligning a ball hitch with a coupling member using a hitch alignment apparatus, the hitch alignment apparatus comprising a mount having a base for engaging an underside of a drawbar of a ball hitch, a pair of walls extending upwardly form said base, latch means for engaging said ball hitch above said base thereby holding said base to said ball hitch, and an opening located between said walls at a rear end of the mount, a back plate removably inserted between said walls at the rear end of said mount, and a ramp member, having a pair of sidewalls, said ramp member being rigidly secured to a front end of said mount with an upper edge of said ramp member at an elevation above said latch means, the method comprising the steps of attaching said hitch alignment apparatus to the drawbar of said ball hitch by said latch means, inserting the back plate between the walls to close the opening, bringing a lower edge of said ramp member into contact with a coupling member of a trailer such that said coupling member travels up said ramp towards said upper edge until said coupling member strikes said back plate, raising said coupling member, removing the back plate, unlatching said hitch alignment apparatus and dropping said base of said hitch alignment apparatus out of engagement with said underside of said drawbar, and lowering said coupling member onto said ball hitch.

\* \* \* \* \*